(12) United States Patent
Angelini et al.

(10) Patent No.: US 11,124,644 B2
(45) Date of Patent: Sep. 21, 2021

(54) ORGANIC MICROGEL SYSTEM FOR 3D PRINTING OF SILICONE STRUCTURES

(71) Applicant: University of Florida Research Foundation, Incorporated, Gainesville, FL (US)

(72) Inventors: Thomas Ettor Angelini, Gainesville, FL (US); Brent S. Sumerlin, Gainesville, FL (US); Christopher S. O'Bryan, Gainesville, FL (US); Wallace Gregory Sawyer, Gainesville, FL (US); Tapomoy Bhattacharjee, Gainesville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 369 days.

(21) Appl. No.: 15/693,389

(22) Filed: Aug. 31, 2017

(65) Prior Publication Data

US 2018/0057682 A1 Mar. 1, 2018

Related U.S. Application Data

(60) Provisional application No. 62/382,652, filed on Sep. 1, 2016.

(51) Int. Cl.
*C08L 53/00* (2006.01)
*C09D 11/102* (2014.01)
(Continued)

(52) U.S. Cl.
CPC ............ *C08L 53/00* (2013.01); *B29C 64/106* (2017.08); *B29C 64/112* (2017.08); *B29C 64/40* (2017.08);
(Continued)

(58) Field of Classification Search
CPC .... C08L 53/00; C08L 2205/025; C09D 11/10; C09D 11/102; B33Y 10/00; B33Y 70/00;
(Continued)

(56) References Cited

U.S. PATENT DOCUMENTS

| 2,340,110 A | 1/1944 | D'Alelio |
| 2,340,111 A | 1/1944 | D'Alelio et al. |

(Continued)

FOREIGN PATENT DOCUMENTS

| CA | 2822487 | 7/2012 |
| CN | 1450953 | 10/2003 |

(Continued)

OTHER PUBLICATIONS

J. Rieger, J. THerm. Anal. 46, 965-972. (Year: 1996).*

(Continued)

*Primary Examiner* — Michael H. Wilson
*Assistant Examiner* — Guy F Mongelli
(74) *Attorney, Agent, or Firm* — Thomas|Horstemeyer, LLP

(57) ABSTRACT

An organic microgel system as support material for 3D printing of soft materials such as silicone and methods for manufacturing and using the organic microgel system are disclosed. In some embodiments, the organic microgel system comprises a plurality of microgel particles formed by blending a di-block copolymer and a tri-block copolymer in an organic solvent. The organic microgel system may allow high precision 3D printing of silicone objects with complex shapes.

23 Claims, 12 Drawing Sheets

(51) Int. Cl.
  *B29C 64/40* (2017.01)
  *B29C 64/112* (2017.01)
  *B33Y 70/00* (2020.01)
  *B33Y 10/00* (2015.01)
  *C09D 11/10* (2014.01)
  *B29C 64/106* (2017.01)
  *C08L 53/02* (2006.01)
  *B29K 105/00* (2006.01)
  *B29K 9/00* (2006.01)
  *B29K 96/04* (2006.01)

(52) U.S. Cl.
  CPC .............. *B33Y 10/00* (2014.12); *B33Y 70/00* (2014.12); *C08L 53/025* (2013.01); *C09D 11/10* (2013.01); *C09D 11/102* (2013.01); *B29K 2009/00* (2013.01); *B29K 2096/04* (2013.01); *B29K 2105/0085* (2013.01); *C08L 2205/025* (2013.01)

(58) Field of Classification Search
  CPC ... B29C 64/112; B29C 64/40; B29K 2096/04; B29K 2009/00; B29K 2105/0085
  USPC ........................................................ 264/308
  See application file for complete search history.

(56) References Cited

U.S. PATENT DOCUMENTS

| | | | |
|---|---|---|---|
| 2,533,635 A | 12/1950 | Seymour et al. | |
| 3,405,213 A * | 10/1968 | Munz | G01D 9/06 264/245 |
| 3,940,351 A | 2/1976 | Schlatzer, Jr. | |
| 4,062,817 A | 12/1977 | Westerman | |
| 4,631,557 A | 12/1986 | Cooke et al. | |
| 5,034,486 A | 7/1991 | Tzai et al. | |
| 5,034,487 A | 7/1991 | Tazi et al. | |
| 5,034,488 A | 7/1991 | Tazi et al. | |
| 5,073,491 A | 12/1991 | Familletti | |
| 5,078,994 A | 1/1992 | Nair et al. | |
| 5,154,962 A * | 10/1992 | Mertens | C08F 287/00 428/41.8 |
| 5,310,779 A | 5/1994 | Lai | |
| 5,349,030 A | 9/1994 | Long, II et al. | |
| 5,470,900 A * | 11/1995 | Sasaki | C08F 297/08 524/261 |
| 5,474,719 A | 12/1995 | Fan | |
| 5,654,362 A | 8/1997 | Schulz, Jr. et al. | |
| 5,697,441 A | 12/1997 | Vercaemer et al. | |
| 5,769,931 A * | 6/1998 | Wang | C09D 11/16 106/31.38 |
| 5,830,951 A * | 11/1998 | Fiedler | A61K 6/90 525/478 |
| 5,837,749 A * | 11/1998 | Erickson | C08K 5/0025 522/31 |
| 6,279,655 B1 | 8/2001 | Pafitis et al. | |
| 6,375,880 B1 * | 4/2002 | Cooper | B29C 33/52 264/138 |
| 6,476,147 B1 * | 11/2002 | Sullivan | A63B 37/0003 473/371 |
| 6,486,901 B1 | 11/2002 | DeBoer et al. | |
| 6,561,807 B2 * | 5/2003 | Hare | C08L 83/04 433/214 |
| 6,936,212 B1 | 8/2005 | Crawford | |
| 6,942,830 B2 | 9/2005 | Muelhaupt et al. | |
| 7,049,346 B1 | 5/2006 | Van Bladel et al. | |
| 7,064,151 B1 * | 6/2006 | Berge | C08F 293/005 521/142 |
| 7,179,872 B2 | 2/2007 | McCormick et al. | |
| 7,285,237 B2 | 10/2007 | Newell et al. | |
| 8,133,341 B2 | 3/2012 | Nealey et al. | |
| 9,102,084 B2 * | 8/2015 | Fork | B29C 48/21 |
| 10,150,258 B2 * | 12/2018 | Feinberg | A61L 27/18 |
| 2003/0083209 A1 * | 5/2003 | Moodycliffe | A61K 8/31 510/118 |
| 2004/0071780 A1 * | 4/2004 | Lillard | B01J 13/14 424/489 |
| 2004/0101518 A1 | 5/2004 | Vacanti et al. | |
| 2004/0120920 A1 * | 6/2004 | Lion | A61K 8/26 424/70.16 |
| 2004/0242837 A1 * | 12/2004 | Toyoda | C08G 8/32 528/158.5 |
| 2005/0074618 A1 * | 4/2005 | King | B41J 2/0057 428/447 |
| 2005/0209403 A1 * | 9/2005 | Walton | C08L 23/08 525/194 |
| 2005/0247357 A1 | 11/2005 | Welle | |
| 2005/0282934 A1 | 12/2005 | Brinkmann et al. | |
| 2006/0136058 A1 | 6/2006 | Pietrzak | |
| 2006/0156978 A1 | 7/2006 | Lipson et al. | |
| 2006/0208388 A1 * | 9/2006 | Bredt | B29C 64/165 264/123 |
| 2006/0211790 A1 * | 9/2006 | Dimotakis | C09D 11/06 523/160 |
| 2009/0101271 A1 * | 4/2009 | Ishida | B33Y 10/00 156/145 |
| 2009/0171001 A1 * | 7/2009 | Lin | C08K 5/01 524/479 |
| 2009/0233230 A1 * | 9/2009 | Hata | C08L 53/00 430/285.1 |
| 2010/0069522 A1 | 3/2010 | Linhardt et al. | |
| 2010/0102415 A1 * | 4/2010 | Millward | B82Y 10/00 257/506 |
| 2010/0137534 A1 * | 6/2010 | Magnet | A61K 8/11 526/193 |
| 2010/0183977 A1 * | 7/2010 | Wang | C08L 33/16 430/270.1 |
| 2010/0184147 A1 | 7/2010 | Cheng et al. | |
| 2010/0304088 A1 | 12/2010 | Steeman et al. | |
| 2010/0321448 A1 | 12/2010 | Buestgens et al. | |
| 2010/0323301 A1 * | 12/2010 | Tang | G03F 7/0037 430/325 |
| 2011/0064810 A1 | 3/2011 | Ghanavi | |
| 2011/0103174 A1 | 5/2011 | Jung et al. | |
| 2011/0256085 A1 * | 10/2011 | Talingting Pabalan | A61K 8/042 424/70.13 |
| 2012/0040013 A1 | 2/2012 | Owens et al. | |
| 2012/0171258 A1 | 7/2012 | Sefton et al. | |
| 2012/0321698 A1 * | 12/2012 | Narain | A61P 21/02 424/450 |
| 2013/0004385 A1 | 1/2013 | Lee et al. | |
| 2013/0029125 A1 * | 1/2013 | Tse | C08L 23/04 428/220 |
| 2013/0084449 A1 * | 4/2013 | Lewis | A61L 27/26 428/221 |
| 2013/0170887 A1 * | 7/2013 | Gillum | B43K 5/1845 401/143 |
| 2013/0184383 A1 * | 7/2013 | Cochran | C09J 153/00 524/68 |
| 2013/0189481 A1 * | 7/2013 | Grosso | C04B 38/0022 428/118 |
| 2013/0209818 A1 * | 8/2013 | Fairclough | B42D 25/29 428/517 |
| 2013/0317131 A1 | 11/2013 | Scales et al. | |
| 2013/0333891 A1 * | 12/2013 | Fripp | E21B 29/02 166/302 |
| 2013/0344601 A1 | 12/2013 | Soman et al. | |
| 2014/0051785 A1 * | 2/2014 | Kumar | C08L 89/00 524/17 |
| 2014/0186952 A1 | 7/2014 | Alsberg | |
| 2014/0224349 A1 | 8/2014 | Ducrée et al. | |
| 2014/0275317 A1 | 9/2014 | Moussa | |
| 2014/0295541 A1 | 10/2014 | Nakanishi et al. | |
| 2014/0377465 A1 * | 12/2014 | Trefonas, III | B82Y 40/00 427/374.4 |
| 2015/0056317 A1 | 2/2015 | Chen | |
| 2015/0057786 A1 | 2/2015 | Murphy et al. | |
| 2015/0091217 A1 * | 4/2015 | Araki | B29C 37/0032 264/447 |

(56) References Cited

U.S. PATENT DOCUMENTS

| | | | |
|---|---|---|---|
| 2015/0093465 A1 | 4/2015 | Page | |
| 2015/0104639 A1* | 4/2015 | Schroeyers | C09J 4/06 |
| | | | 428/349 |
| 2015/0119817 A1* | 4/2015 | Prasad | C08L 23/06 |
| | | | 604/221 |
| 2015/0148467 A1* | 5/2015 | Greger | C08L 23/10 |
| | | | 524/151 |
| 2015/0210016 A1* | 7/2015 | Okamoto | B28B 1/001 |
| | | | 428/206 |
| 2015/0217024 A1 | 8/2015 | Wang et al. | |
| 2015/0225589 A1* | 8/2015 | Ohori | C09D 11/52 |
| | | | 252/500 |
| 2015/0315377 A1* | 11/2015 | Mehta | C08L 23/12 |
| | | | 524/525 |
| 2016/0062230 A1* | 3/2016 | Wu | G03F 1/68 |
| | | | 428/195.1 |
| 2016/0106663 A1* | 4/2016 | Gulbin | A61K 8/027 |
| | | | 424/401 |
| 2016/0161872 A1* | 6/2016 | Orrock | G03G 9/08766 |
| | | | 264/484 |
| 2016/0167312 A1* | 6/2016 | Feinberg | A61L 27/18 |
| | | | 264/239 |
| 2016/0196892 A1* | 7/2016 | Ohori | H01B 1/127 |
| | | | 345/173 |
| 2016/0215130 A1* | 7/2016 | Esseghir | C08L 23/12 |
| 2016/0378004 A1* | 12/2016 | Martin | G03G 9/0904 |
| | | | 264/484 |
| 2017/0267883 A1* | 9/2017 | Engler | C09D 11/38 |
| 2018/0154581 A1* | 6/2018 | Dentinger | B29C 64/118 |
| 2019/0338079 A1* | 11/2019 | Luo | C08K 5/37 |
| 2020/0032062 A1* | 1/2020 | Wallin | B29C 64/129 |

FOREIGN PATENT DOCUMENTS

| | | |
|---|---|---|
| CN | 102164661 | 8/2011 |
| CN | 203305668 U | 11/2013 |
| FR | 2583334 | 12/1986 |
| FR | 2634686 | 2/1990 |
| GB | 2500412 A | 9/2013 |
| JP | S61-98547 | 5/1986 |
| JP | 4636770 | 12/2010 |
| JP | 5167496 | 1/2013 |
| JP | 2014207886 | 11/2014 |
| KR | 1020120094954 A | 8/2012 |
| WO | 0178968 | 10/2001 |
| WO | 2006027702 | 3/2006 |
| WO | 2009139395 | 11/2009 |
| WO | 2012155110 | 11/2012 |
| WO | 2014024048 | 2/2014 |
| WO | 2014039825 | 3/2014 |
| WO | 2014049204 | 4/2014 |
| WO | 2014182885 | 11/2014 |
| WO | 2014205261 | 12/2014 |
| WO | 2014209994 | 12/2014 |
| WO | 2015017421 A2 | 2/2015 |
| WO | 2015019212 | 2/2015 |
| WO | 2015107333 | 7/2015 |
| WO | 2015138566 | 9/2015 |
| WO | 2016044547 | 3/2016 |
| WO | WO-2016044547 A1 * | 3/2016 ............ B33Y 10/00 |
| WO | 2018187595 A1 | 10/2018 |
| WO | 2018187780 A1 | 10/2018 |

OTHER PUBLICATIONS

Vermeer, Soft Matter 7, 10345 (Year: 2011).*

Muth, JT, et al. Embedded 3D Printing of Strain Sensors within Highly Stretchable Elastomers; 2014, 26, pp. 6307-6312, Advanced Materials; www.advmat.de.

Hinton, TJ, et al.; 3D Printing PDMS Elastomer in a Hydrophilic Support Bath via Freeform Reversible Embedding; ACS Biomaterials Science and Engineering; May 4, 2016; 26 pages.

Landers, R, et al. Desktop manufacturing of complex objects, prototypes and biomedical scaffolds by means of computer-assisted design combined with computer-guided 3D plotting of polymers and reactive oligomers. Macromolecular Materials and Engineering 2000 282(1):17-21.

Schaefermeier PK, et al. Design and fabrication of three-dimensional scaffolds for tissue engineering of human heart valves. Eur Surg Res. 2009 42(1):49-53.

Hinton, et al. "Three-dimensional printing of complex biological structures by freeform reversible embedding of suspended hydrogels," Sci. Adv. 2015, 1:e1500758.

Office Action received in Japanese Patent Application No. 2017-530102 dated Oct. 29, 2019. [English translation provided].

Rudert, et al. "Experimental and numerical investigation of a viscoplastic Carbopol gel injected into a prototype 3D mold cavity," J Non-Newtonian Fluid Mechanics, 2009, vol. 161, pp. 60-68.

Khalil, et al. "Multi-nozzle deposition for construction of 3D biopolymer tissue scaffolds," Rapid Prototyping Journal, 2005, vol. 11/1, pp. 9-17.

Examination Report for Indian Patent Application 201717021950 dated Nov. 16, 2020.

Izidoro, Dayane, et al. "Sensory evaluation and rheological behavior of commercial mayonnaise." International Journal of Food Engineering 3.1 (2007). (Year: 2007).

Gutowski, Iris A., et al. "Scaling and mesostructure of Carbopol dispersions." Rheologica acta 51.5 (2012): 441-450. (Year: 2012).

Kim, Jong-Yun, et al. "Rheological properties and microstructures of Carbopol gel network system." Colloid and Polymer Science 281.7 (2003): 614-623. (Year: 2003).

L. Baudonnet et al., "Effect of Dispersion Stirring Speed on the Particle Size Distribution and Rheological Properties of Three Carbomers", Journal of Dispersion Science and Technology vol. 25, No. 2, pp. 183-192, 2004.

Aldrich, S. (2019) "Thermal transitions of homopolymers: Glass transition & melting point.".

Antoni, D.; et al. (2015) "Three-Dimensional Cell Culture: a Breakthrough in Vivo." International journal of molecular sciences, 16(3), pp. 5517-5527.

Baudonnet, L., J-L.; et al. (2004) "Effect of Dispersion Stirring Speed on the Particle Size Distribution and Rheological Properties of Three Carbomers." Journal of dispersion science and technology 25.2 : 183-192.

Beck, Emily C., et al. (2015) "Enabling Surgical Placement of Hydrogels Through Achieving Paste-Like Rheological Behavior in Hydrogel Precursor Solutions." Annals of biomedical engineering 43.10 : 2569-2576.

Bhattacharjee, Tapomoy, et al. (2016) "Liquid-Like Solids Support Cells in 3D." ACS Biomaterials Science & Engineering 2.10 : 1787-1795.

Chang, Ya-Wen, et al. (2015) "Biofilm Formation in Geometries with Different Surface Curvature and Oxygen Availability." New Journal of Physics 17.3 : 033017.

Chinese Office Action dated Feb. 15, 2019 for Chinese Patent Application 2015800755428.

Conrad, Jacinta C; et al. (2008) "Structure of Colloidal Gels During Microchannel Flow." Langmuir 24.15 : pp. 7628-7634.

Derby, Brian. (2012) "Printing and Prototyping of Tissues and Scaffolds." Science 338.6109 : 921-926.

Ellis, Perry W., et al. (2018) "Curvature-Induced Defect Unbinding and Dynamics in Active Nematic Toroids." Nature Physics 14.1 : 85-90.

European Search Report in Appln. No. 15865693.4 dated Jul. 18, 2018.

Hardin, James O., et al. (2015) "Microfluidic Printheads for Multimaterial 3D Printing of Viscoelastic Inks." Advanced materials 27.21 : 3279-3284.

International Search Report for PCT/US2016/031385 dated Aug. 11, 2016.

International Search Report issued by U.S. for PCT/US2016/064771 dated Jan. 18, 2017.

International Search Report issued in European Patent Application PCT/US2016/017810 dated Jul. 12, 2016.

(56) References Cited

OTHER PUBLICATIONS

International Search Report dated Feb. 16, 2016 for PCT Patent Application PCT/US2015/064063.

International Search Report dated Nov. 22, 2016 for PCT Patent Application No. PCT/US2016/050175.

International Search Report dated Dec. 30, 2016 for PCT Patent Application No. PCT/US2016/052102.

Jin, Yifei, et al. (2016) "Granular Gel Support-Enabled Extrusion of Three-Dimensional Alginate and Cellular Structures." Biofabrication 8.2 : 025016.

Liu, Guangyao,;et al (2012) "Development of Thermosensitive Copolymers of Poly (2-Methoxyethyl Acrylate-Co-Poly (Ethylene Glycol) Methyl Ether Acrylate) and their Nanogels Synthesized by RAFT Dispersion Polymerization in Water." Polymer Chemistry 3.2 : 504-513.

Moxon, Samuel Robert, (2016) "Development of Biopolymer Hydrogels as Complex Tissue ENgineering Scaffolds" Doctoral thesis, University of Huddersfield. 211 pages.

Murphy, Sean V.,; et al. (2014) "3D Bioprinting of Tissues and Organs." Nature biotechnology 32.8 : 773-785.

Pairam, E., H. Le,; et al. (2014) "Stability of Toroidal Droplets Inside Yield Stress Materials." Physical Review E 90.2 : 021002.

Pairam, Ekapop, et al. (2013) "Stable Nematic Droplets with Handles." Proceedings of the National Academy of Sciences 110.23 : 9295-9300.

Pfister, Andreas, et al. (2004) "Biofunctional Rapid Prototyping for Tissue-Engineering Applications: 3D Bioplotting Versus 3D Printing." Journal of Polymer Science Part A: Polymer Chemistry 42.3 : 624-638.

Roberts, Geraint P.,; et al. (2001) "New Measurements of the Flow-Curves for Carbopol Dispersions Without Slip Artefacts " Rheologica Acta 40 5 : 499-503.

Search Report issued in EP Patent Application 16793291, dated Feb. 5, 2019.

Smith, D., 'Multi-Material Breakthrough for 3D Printing ' [Press Release] The Technology Partnership, Sep. 4, 2013.

The Diamond Hotend '[Product] RepRap.me: http://reprap.me/fronlpage-show/diamond-holend.hlml.

The Technology Partnership'. [Relevant Business; Melbourn, UK] http://www.llp.com/printing.

Tumbleston, John R., et al.(2015) "Continuous Liquid Interface Production of 3D Objects." Science 347.6228 : 1349-1352.

Wu, Kun-Ta, et al. (2017) "Transition From Turbulent to Coherent Flows in Confined Three-Dimensional Active Fluids." Science 355.6331 : eaal1979.

Office Action received in Japanese Patent Application No. 2017-557950 dated Jan. 7, 2020. [English translation provided].

Bayliss et al., Comparing colloidal phase separation induced by linear polymer and by microgel particles, Soft Matter, 7, 10345, 2011.

* cited by examiner

FIG. 12D   FIG. 12E

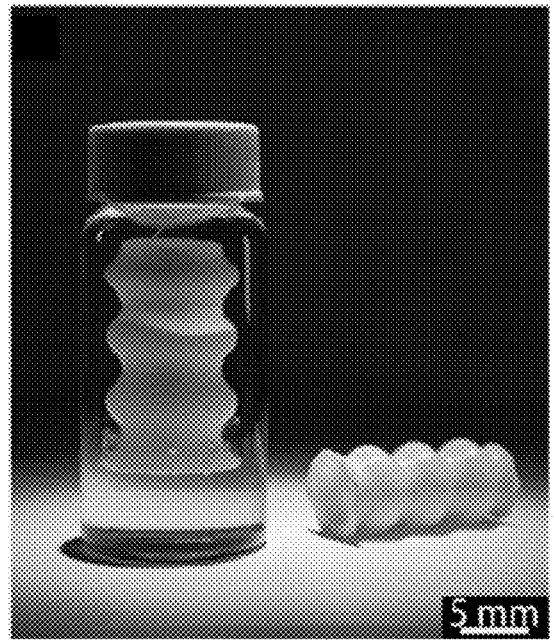
FIG. 13A
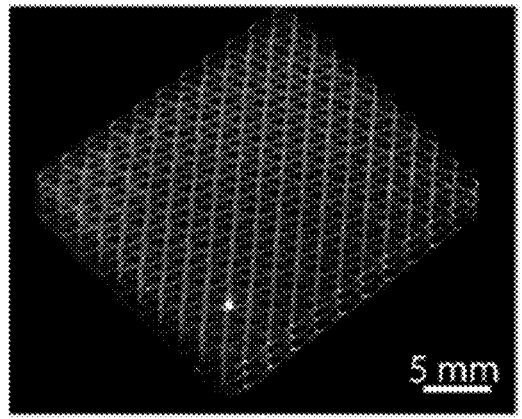
FIG. 13B
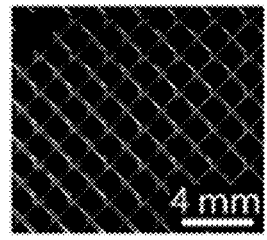 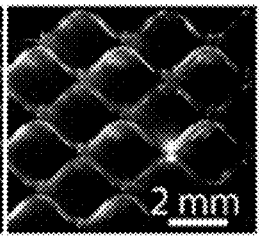
FIG. 13C  FIG. 13D
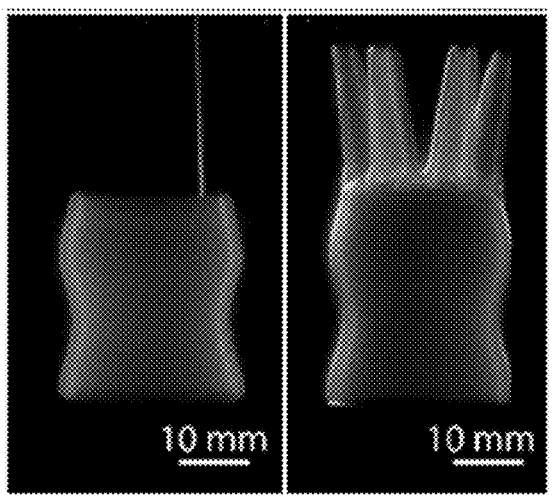 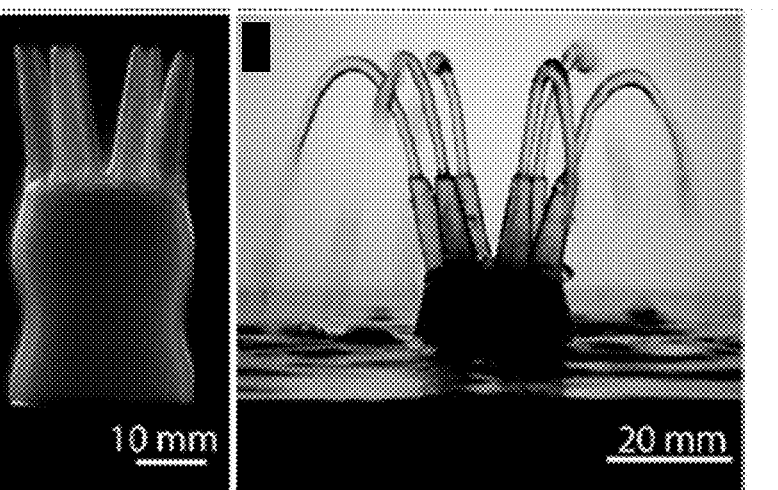
FIG. 13E  FIG. 13F  FIG. 13G

ORGANIC MICROGEL SYSTEM FOR 3D PRINTING OF SILICONE STRUCTURES

RELATED APPLICATIONS

This Application claims priority under 35 U.S.C. § 119(e) to U.S. Provisional Application Ser. No. 62/382,652, entitled "ORGANIC MICROGEL SYSTEM FOR 3D PRINTING OF SILICONE STRUCTURES" filed on Sep. 1, 2016, which is herein incorporated by reference in its entirety.

GOVERNMENT SUPPORT

This invention was made with Government support under DMR1352043 awarded by the National Science Foundation. The Government has certain rights in this invention.

FIELD

Disclosed embodiments relate to materials for supporting silicone-based ink in a three-dimensional printing operation and methods for manufacturing the same.

BACKGROUND

Three dimensional printing (3D printing) is a novel additive manufacturing technique in industrial and consumer applications.

Objects made of soft materials, such as silicone elastomer, enjoy a wide range of applications in biomedical diagnostics, therapeutics as well as consumer electronics. Silicone elastomer enables properties such as low elastic modulus, high extensibility and toughness, excellent thermal and oxidative stability, and chemical inertness. However, it is difficult or impractical to form many objects of silicone elastomer using conventional 3D printing techniques. Conventional approaches are not suitable for efficiently forming objects of soft materials with complex shapes and high resolution.

The inventors have recognized and appreciated efficient manufacturing methods that can be applied in existing applications as well as to enable new applications for 3D printing in forming silicone-based objects.

SUMMARY

In some embodiments, a method of manufacturing a three-dimensional silicone structure is disclosed. The method comprises injecting ink material comprising silicone into a support material and displacing the support material with the ink material, and curing the silicone material while retaining the ink material with the support material. The ink material is injected in a pattern conforming to the three-dimensional structure and the support material comprises an organic solvent and a block copolymer such that it is immiscible with the ink material.

In some embodiments, a support material for supporting silicone-based ink in a 3D printing operation is disclosed. The support material comprises a plurality of microgel particles. Each of the plurality of microgel particles comprises a crosslinked polymer network. The crosslinked polymer network comprises a plurality of tri-block copolymer molecules; a plurality of di-block co-polymer molecules; and an organic solvent. The plurality of microgel particles are swollen in the organic solvent.

In some embodiments, a method of manufacturing a support material for supporting silicone-based ink in a 3D printing operation is disclosed. The method comprises blending a di-block copolymer and a tri-block copolymer in an organic solvent; heating the solvent mixture to above a first temperature and cooling the solvent mixture from the first temperature to below the first temperature to form a plurality of microgel particles.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings:

FIG. 12D is a scanning electron microscopy image of the cross-section of a printed silicone structure;

FIG. 12E is a scanning electron microscopy image of a 3D printed "dog-bone" part designed for testing mechanical strength;

FIGS. 13A-13G shows photographs of 3D printed silicone structures using microgel system as support material according to some embodiments.

DETAILED DESCRIPTION

Figure 1:
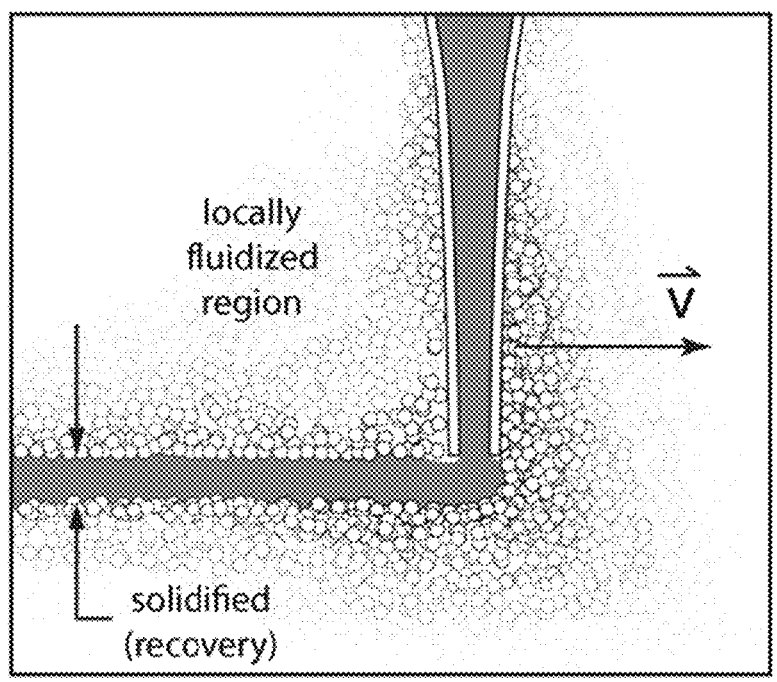
FIG. 1 is a schematic representation of one embodiment of an apparatus for printing an ink material in a support material.

The inventors have recognized and appreciated that a new support material for 3D printing of soft materials such as silicone may be provided using the materials and methods described herein. The inventors have recognized and appreciated that using an organic microgel system as support material for 3D printing of silicone as described herein may allow for high precision printing of silicone objects with complex shapes.

The inventors have recognized and appreciated that creating a support material using the materials and methods described herein may allow for 3D printing with ink material comprising silicone elastomers without issues such as instabilities related to ink material sag and interfacial tension. The inventors have recognized and appreciated that during 3D printing of soft ink materials such as silicone, it is desirable to use a support material that provides sufficient mechanical support for the printed structure to reduce ink material sag and dispersion in order to avoid unstable structures while the silicone-based ink is cured. The inventors have also recognized and appreciated that a low interfacial tension between the immiscible ink material and support material is desired in order to avoid unstable breakup of the printed structures.

Further, the inventors have recognized and appreciated formulations of support material that may achieve some or all of these objectives. In some embodiments, the microgel system comprises organic solvents such as mineral oil. The inventors have recognized and appreciated that the interfacial tension between silicone and organic solvents is low, which is beneficial for precise 3D printing of silicone structures, such that a microgel system using an organic solvent is well suited for 3D printing of silicone-based objects.

In some embodiments, a microgel system is provided as the support material with desired rheological properties including low modulus, low yield stress, localized yielding behavior, and spontaneous re-flow after yielding and short thixotropic time that may overcome instability issues in silicone 3D printing and allow for precision 3D printing of ink materials immiscible in the support material. In some embodiments, packed microgels provide a self-healing environment, allowing a printing nozzle to transverse the same region repeatedly while simultaneously supporting the structure.

In some embodiments, the microgel system comprises microgel particles that may swell with the organic solvent to form a support material (herein also referred to as an "organogel support material") for supporting silicone based ink in a 3D printing operation. As used herein, "particle" refers to a volume of material that may comprise a network of polymers. Depending on the particular embodiment, the swollen microgel particles may have a characteristic size at the micron or submicron scales. For example, in some embodiments, the swollen microgel particles may have an average diameter between about 2 and 6 μm, or between 0.1 μm and 100 μm, although microgel particles with any suitable size may be used. Furthermore, an organogel support material may have any suitable combination of mechanical properties, and in some embodiments, the mechanical properties may be tuned via the relative concentration of microgel particles and organic solvent. For example, a higher concentration of microgel particles in organic solvent may result in a support material having a higher elastic modulus and/or a higher yield stress.

According to some embodiments, a microgel system may be made from materials such that the granular microgel particles undergo a temporary phase change due to an applied stress (e.g. a thixotropic, "yield stress" material or "shear thinning" material). Such materials may be solids or in some other phase in which they retain their shape under applied stresses at levels below their yield stress. At applied stresses exceeding the yield stress, these materials may become fluids or in some other more malleable phase in which they may alter their shape. When the applied stress is removed, yield stress materials may become solid again. Stress may be applied to such materials in any suitable way. For example, energy may be added to such materials to create a phase change. The energy may be in any suitable form, including mechanical, electrical, radiant, or photonic, etc.

The terms "yield stress" and "yield stress material", unless indicated otherwise, should be understood to be a Herschel-Bulkley yield stress determined using the Herschel-Bulkley equation $$\sigma = \sigma_y + k\dot{\gamma}^p$$

where $\sigma_y$ is yield stress, $\sigma$ is shear stress, k is viscosity index of the material, $\dot{\gamma}$ is shear rate, and p is a positive number, and a material having such a yield stress.

Unless indicated otherwise herein, a yield stress of a sample is determined by shearing the sample in a rheometer using plate-plate geometry and via the Herschel-Bulkley equation, via the following process. Prior to shearing, the rheometer tool surfaces may be roughened to prevent or mitigate slipping at the sample-tool interface. Using the rheometer, the sample is sheared at a variety of shear rates, extending from high shear rates (e.g., 1000 $s^{-1}$) to low shear rates (0.001 $s^{-1}$). For each shear rate, the sample is sheared for 30 seconds, after which shear stress data is collected and averaged. A series of shear stress measurements are collected sequentially for each shear rate. These shear rates are then used, via the Herschel-Bulkley equation, to determine (1) whether the material has a yield stress (i.e., a Herschel-Bulkley yield stress), and (2) the yield stress for the material. Those skilled in the art will appreciate that, for a material having a yield stress, a plot of shear stress versus shear rate will exhibit a plateau region at low shear rates, with the data points asymptotically approaching the material's yield stress at low shear rates. The yield stress is the shear stress at these low, near-zero shear rates, or an estimate of shear stress at zero strain rate determined using a low or near-zero shear rate, such as a shear rate of $10^{-3}$ $s^{-1}$. As used herein (unless indicated otherwise), a "yield stress material" will be a material that has a yield stress determinable via this process. Those skilled in the art will appreciate that for a yield stress material (i.e., a Herschel-Bulkley yield stress material) at low shear (e.g., a near-zero shear rate), a shear stress is independent of shear rate and instead exhibits only a shear stress dependent only on an elastic component of the material.

Those skilled in the art that materials having a yield stress will have certain thixotropic properties, such as a thixotropic time.

As used herein, a thixotropic time is a time for shear stress to plateau following removal of a source of shear. The inventors recognize that thixotropic time may be measured in different ways. As used herein, unless indicated otherwise, thixotropic time is determined by applying to a material, for several seconds, a stress equal to 10 times the yield stress of the material, followed by dropping the stress to 0.1 times the yield stress. The amount of time for the shear rate to plateau following dropping of the stress is the thixotropic time.

A yield stress material as described herein may have any suitable mechanical properties that, on the one hand, yield under stress to enable injection of an "ink" in a controlled pattern, but, on the other hand, retain the ink in that patter when the stress is removed. For example, in some embodiments, a yield stress material may have an elastic modulus between approximately 1 Pa and 1000 Pa when in a solid phase or other phase in which the material retains its shape under applied stresses at levels below the yield stress. In some embodiments, the yield stress required to transform a yield stress material to a fluid-like phase may be less than about 100 Pa, between approximately 1 Pa and 1000 Pa, or between approximately 1 Pa and 10 Pa. When transformed to a fluid-like phase, a yield stress material may have a viscosity between approximately 1 Pa s and 10,000 Pa s. However, it should be understood that other values for the elastic modulus, yield stress, and/or viscosity of a yield stress material are also possible, as the present disclosure is not so limited.

According to some embodiments, a support material for 3D printing made from a yield stress material may allow 3D printing of soft ink materials such as silicone to form a desired structure in three dimensions. For example, a computer-controlled injector tip may trace out a spatial path within a support material and inject ink materials at locations along the path to form a desired 3D pattern or shape. Movement of the injector tip through the support material, with or without vibration, may impart sufficient mechanical energy to cause yielding in a region around the injector tip to allow the injector tip to easily move through the support material, and also to accommodate injection of ink material. However, it should be appreciated that other techniques for imparting energy to cause yielding in a localized region around the tip of the injector may alternatively or additionally be used.

After injection, the ink material may be transformed into a permanent solid-like phase having the printed 3D pattern or shape. In some embodiments, the silicone ink material may be cured within the microgel support material using, for example, UV illumination, to achieve a phase change. The printed object may be extracted after curing by removing the surrounding support material using any suitable means.

Although printing of ink material using an injector tip is discussed, it should be understood that the materials and methods disclosed in the present application is not limited to any particular 3D printing techniques.

According to some embodiments, a support material for 3D printing of silicone may be immiscible with silicone in the ink material. In some embodiments, it is desirable to reduce the interfacial tension between the support material and silicone to avoid instabilities due to breakup during printing. In some embodiments, the interfacial tension between an organogel support material and silicone may be less than about 30 mN/m, or between about 0.5 and 20 mN/m, or between about 0.1 and 5 mN/m.

In some embodiments, a combination of values such as the interfacial tension between the support material and ink material and the yield stress of the support material may be selected to establish mechanical and rheological properties between the silicone ink material and support material such that instability issues such as ink material sag or dispersion during 3D printing of silicone may be alleviated. In some embodiments, the support material—silicone interfacial tension and the yield stress of the support material has a ratio of between approximately 1:5 and 1:20, with a unit of mN/mPa. However, it should be appreciated that other values for the ratio between interfacial tension and yield stress may enable 3D printing of 3D structures with fine feature sizes. In some embodiments, the materials and methods as described herein may allow 3D printing of silicone with feature size of less than 200 µm, less than 140 µm, between 10 and 140 µm, between 30 and 150 µm, or between 20 and 200 µm.

In accordance with some embodiments, an organic microgel system with suitable rheological properties may be created through the self-assembly of di-block and tri-block copolymers in organic solvents and prepared at low concentrations and proper di-block to tri-block ratios.

In some embodiments, di-block copolymer molecules with a first end and a second end may be used in forming the microgel. The first end may be a relatively hydrophilic block while the second end may be a relatively hydrophobic block. In one example, the first end may be styrene and the second end may be a rubber such as ethylene/propylene, thus the di-block copolymer may be styrene-ethylene/propylene (SEP). The inventors have recognized and appreciated that when crosslinked, di-block copolymer molecules such as SEP form packed micelles based on polystyrene cores connected by bridges of ethylene/propylene. In some embodiments, a suspension of discrete micelles is formed in the pure di-block copolymer network such as SEP.

In some embodiments, tri-block copolymer molecules with a first end, an intermediate section and a second end may be used in forming the microgel. The first end and the second end of the tri-block copolymer are relatively hydrophilic, and wherein the intermediate section is disposed between the first end and the second end and is relatively hydrophobic. In one example, the first end and the second end may be styrene and the intermediate section may be a rubber such as ethylene/butylene, thus the tri-block copolymer may be styrene-ethylene/butylene-styrene (SEBS). The inventors have recognized and appreciated that when crosslinked, tri-block copolymer molecules such as SEBS form packed micelles based on hard polystyrene cores and as a result, neighboring polystyrene cores are physically connected by bridges of ethylene/butylene blocks, resulting in a macroscopic network. In some embodiments, the size of each polystyrene core is determined by the polystyrene block number and mass density within the di-block copolymer while the spacing between cores is driven by the swelling of the oil-soluble block of the di-block copolymer.

The inventors have recognized and appreciated that di-block copolymer such as SEP when used alone, may exhibit liquid-like behavior. On the other hand, the inventors have recognized and appreciated that tri-block copolymer such as SEBS is a material typically with higher stiffness and higher yield stress than di-block copolymer. The inventors have recognized and appreciated that by blending di-block copolymer such as SEP with a tri-block copolymer such as SEBS may lead to improved mechanical and rheological property to provide support for 3D printing of silicone. Glassy polystyrene cores formed in the blended tri-block and di-block copolymer system may prevent dynamic exchange of polymers between structures. In some embodiments, the mixture of di-block copolymer and tri-block copolymer form a jammed pack of microgel particles or a jammed micro-organogel, with particle size of between approximately 0.1 to 100 µm. As used herein, "jammed" refers to being in a jammed state of a material. The inventors have recognized and appreciated that selection of different types of block units for the di-block copolymer in the mixture may be used to tune swelling of the microgel system in organic solvents, while selection of different types of block units for the tri-block copolymer in the mixture may be used to tune the stiffness, among other mechanical and rheological properties of the microgel system. In some embodiments, the microgel particle size may be tuned by the ratio between the di-block and tri-block copolymers as well as the concentration of the copolymers in the organic solvent. In one non-limiting example, the ratio between di-block SEP to tri-block SEBS copolymer is substantially 50:50 (wt %), although it should be appreciated that other suitable ratio may be used.

It should be appreciated that any suitable mixture of block copolymers may be used to achieve the desired mechanical, rheological and interfacial properties for 3D printing of soft materials such as silicone. Although linear di-block and tri-block copolymers are discussed, such discussion are provided as example only and the organogel support material may be formed with copolymers of any suitable shape, such as linear, stars, crosses.

In some embodiments, to prepare the organogel support material, the mixture of di-block and tri-block copolymer molecules are blended in an organic solvent. The organic solvent may be mineral oil, although any suitable organic solvent may be used. For example, the organic solvent may be paraffin oil, or any organic solvent immiscible with silicone ink material but can dissolve hydrophobic block units in a copolymer. Subsequently, the blended copolymers and the organic solvent are heated to a temperature above the glass transition temperature of a block unit of the copolymers in order to melt the copolymer molecules. In one example, the organic solvent with the copolymer blend are heated above the glass transition temperature of polystyrene. In a non-limiting example, the blend comprises di-block SEP and tri-block SEBS copolymers and the temperature is between 50 and 150° C., or between 100 and 180° C. It is understood that any suitable amount of heating time and any suitable mixing or stirring techniques may be used to facilitate melting of the copolymers, before allowing the organic solvent to cool down to below the glass transition temperature of polystyrene when the copolymers are crosslinked to form a polymer network. In some embodiments, the polymer network comprises microgel particles to be used as organogel support material in 3D printing of silicone.

In some embodiments, mechanical, rheological and/or interfacial tension properties of the organogel support material for 3D printing of silicone ink material may be tuned via the relative concentration of copolymer molecules and organic solvent. For example, a higher concentration of copolymers and microgel particles in organic solvent may result in a support material having a higher elastic modulus and/or a higher yield stress. In some embodiments, 90% to 99.9%, or 80 to 95%, or more than 85% of the support material is organic solvent by weight, although it should be appreciated that any suitable concentration of the organic solvent may be used to achieve precision printing of 3D silicone structure.

In some embodiments the organogel formed by heating a polymer mixture as described above in an organic solvent may, after cooling, be used as the support material. In other embodiments, the resulting organogel may be further processed to remove the solvent, leaving the polymer structure intact. As a result, the microgel particles may take the form of a solid. For example, resulting solid particles may be in the form of powders that can be packaged using any suitable means for transport and for sale, without the necessary accommodations and related costs associated with an oil-based support material that are mostly liquid. In some embodiments, the solid particles may comprise a dry polymer network of crosslinked di-block and tri-block copolymers. The solvent-free particles may be reconstituted or re-solvated by a user or customer by the addition of a suitable amount of organic solvent. In some embodiments, the microgel particles may retain the desired mechanical, rheological and interface tension properties once reconstituted in organic solvent, without the need for heating. In one example, a customer may blend the solvent-free microgel particles in mineral oil at room temperature to obtain an organogel support material for 3D printing of soft materials such as silicone without the capital and energy expense of heating equipment. However, it should be appreciated that heating below the glass transition temperature of the polymer may facilitate re-solvation.

Turning now to the figures, specific non-limiting embodiments of organic microgel systems for 3D printing of silicone and methods for their preparation and/or use are described in more detail.

FIG. 1 depicts a schematic representation of one embodiment of an apparatus for printing an ink material in a support material. In the embodiment shown in FIG. 1, a computer-controlled injector tip traces out a horizontal path with a lateral velocity of v towards the right direction within a support material while injecting ink materials at locations along the horizontal path. The injected ink material solidifies to form a desired 3D pattern or shape. The support material fluidizes as movement of the injector tip displaces the support material and imparts sufficient mechanical energy to cause yielding in a region around the injector tip to allow the injector tip to easily move through the support material. In some embodiments, movement of the injector tip may additionally include a vibratory movement in order to locally fluidize the yield stress support material with the vibration energy. The yielding also accommodates injection of ink material.

Figure 2:
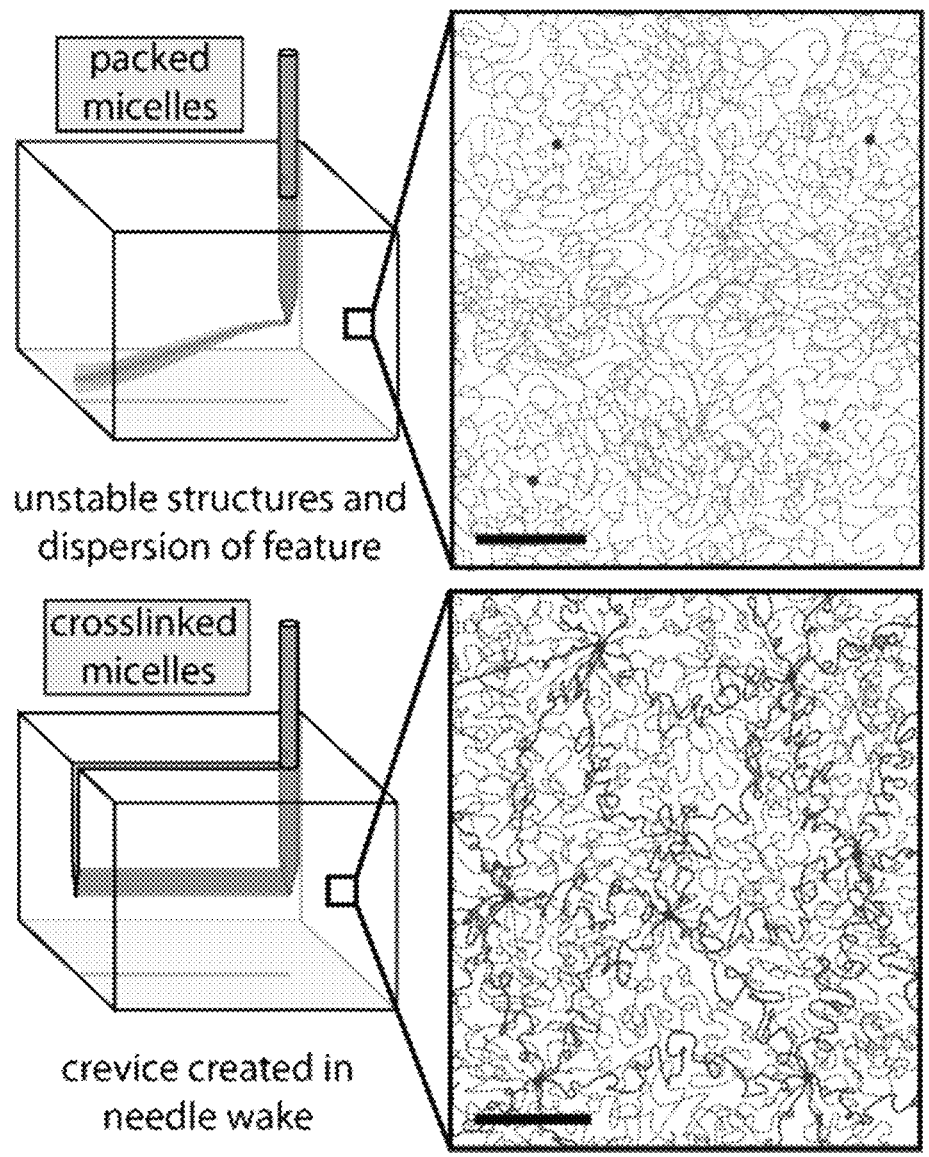
FIG. 2 is a schematic diagram depicting printing of ink material in a support material comprising di-block copolymers and another support material comprising tri-block copolymers.

FIG. 2 is a schematic diagram depicting printing of ink material in a support material comprising di-block copolymers and another support material comprising tri-block copolymers. The scale bars are 15 nm. In FIG. 2, di-block copolymer materials form packed micelles with fluidic yielding properties. Printing into the di-block micelle suspension is made difficult by its fluid-dominated rheology. Printed features may move under buoyancy forces or break up into droplets. FIG. 2 also shows that with respect to crosslinked tri-block copolymers, stiff network of crosslinked micelles may be formed. In some cases, printing into the tri-block copolymer network is made difficult by its solid properties. While the crosslinked network is capable of supporting structures, the printing nozzle severs polymer bridges as it traverses through the printing medium, irreversibly damaging the gel when the copolymer material is not yielding enough to provide elastic recovery in the wake of the injector needle.

Figure 3:
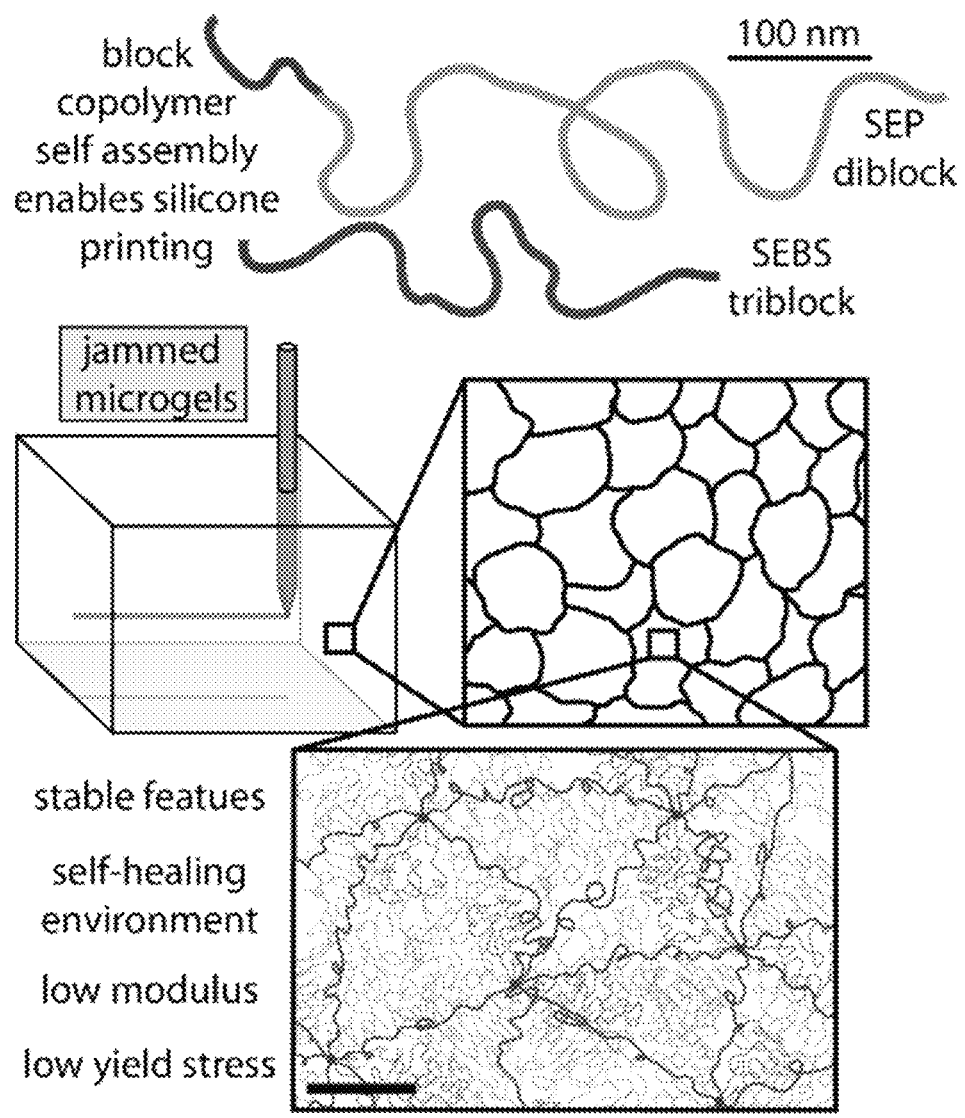
FIG. 3 is a schematic diagram depicting printing of ink material in a support material comprising a blend of di-block copolymer SEP and tri-block copolymer SEBS in mineral oil.

FIG. 3 is a schematic diagram depicting printing of ink material in a support material comprising a blend of di-block copolymer SEP and tri-block copolymer SEBS in mineral oil. The scale bar is 15 nm. FIG. 3 shows that a jammed microgel may be formed by crosslinking both the di-block and tri-block copolymer, where it is understood that tri-block copolymer may contribute to the overall stiffness of the microgel while the di-block copolymer may contribute tuning the swelling property of the microgel in mineral oil.

By blending di-block SEP copolymer with tri-block SEBS copolymer, improved mechanical and rheological property may be reached as support for 3D printing of silicone such that the support material fluidizes at the location of applied stress and rapidly re-solidify upon the removal of stress to enable precise printing of 3-D structures with a feature size of less than 200 µm, or less than 100 µm.

According to one example, a microgel comprising SEP and SEBS copolymers is prepared by mixing in light mineral oil (NF/FCC) (Fisher Scientific) a blend of Kraton G-1702, which is a linear SEP di-block copolymer, with Kraton G-1650, which is a linear SEBS tri-block copolymer. The mixture of block copolymers is prepared at 2.25 wt % di-block copolymer, 2.25 wt % tri-block copolymer, and 95.5 wt % light mineral oil. The mixed samples are heated to 150° C. and continuously mixed using a Scilogex Overhead Stirrer set to 250 RPMs for 4-6 hours. Although 150° C. is provided in this example, any suitable temperature higher than the glass transition temperature of the polystyrene block in the copolymers may be used.

Although a 50:50 ratio between di-block and tri-block copolymer by weight and 95.5% wt % light mineral oil is disclosed, such formulation is provided by way of an example only and the materials and methods according to aspects of the present application are not limited to an exact formulation. The properties of the mixture solution may vary with the mineral oil concentration. When the mineral oil concentration is too low, formation of a macroscopic gel is observed whereas when the mineral oil concentration is too high, the solution does not behave as an elastic solid at low stresses and is thus not suitable for 3D printing. In some embodiments, the organogel support material may be prepared with more than 90%, more than 94%, less than 99%, less than 97%, between 94% to 99%, or between 94 wt % to 97 wt % mineral oil. Similarly, the properties of the mixture solution may vary with the di-block:tri-block copolymer ratio. When the di-block:tri-block ratio is too high, the solution no longer behaves as an elastic solid, whereas when the di-block:tri-block ratio is too low, the solution behaves as a macroscopic gel. In some embodiments, the organogel support material may be prepared with a di-block:tri-block copolymer ratio of less than 75:25, less than 55:45, more than 45:55, more than 25:75, between 25:75 to 75:25, or between 45:55 to 55:45 by weight.

Figure 4:
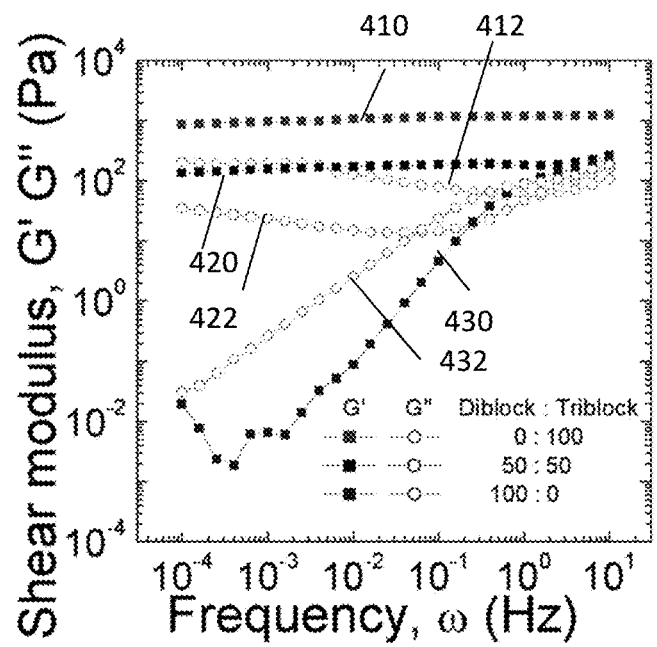
FIG. 4 is a data plot of measured shear modulus G' and G" as a function of oscillatory stress frequency for microgels prepared according to some exemplary embodiments.

To illustrate the mechanical and rheological behavior of the support material according to some embodiments with different formulations, FIG. 4 is a data plot of measured elastic and viscous shear moduli G' and G" for samples prepared with only tri-block copolymer (curves 410, 412), with a 50:50 mixture of di-block and tri-block copolymer (wt %) (curves 420, 422) and with only di-block copolymer (curves 430, 432) as a function of an applied oscillatory stress frequency at low strain rate amplitude (1%) for microgels prepared according to some exemplary embodiments. In the data plots in FIG. 4, the copolymer blends are dissolved in mineral oil with an oil concentration of 95.5% (wt %).

Figure 5:
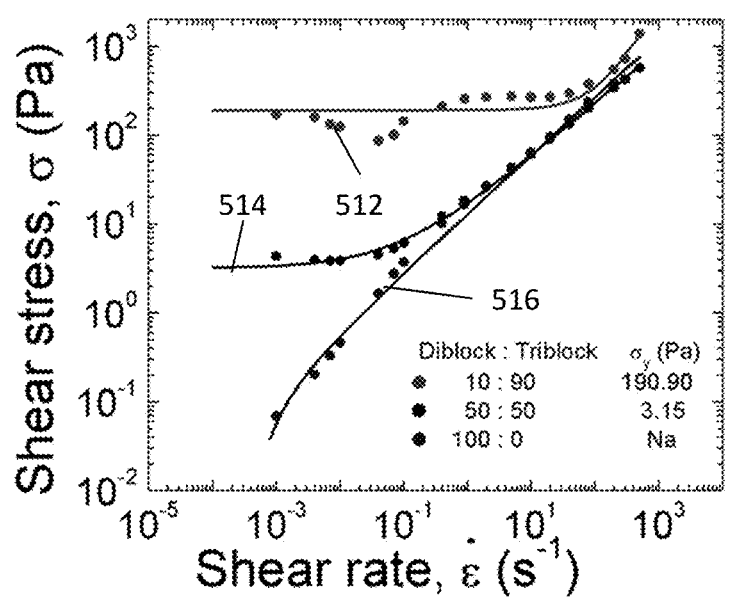
FIG. 5 is a data plot of measured shear stress σ as a function of shear rate c for microgels prepared according to some exemplary embodiments.

FIG. 5 is a data plot of measured shear stress σ as a function of shear rate c for microgels prepared according to some exemplary embodiments with a 10:90 wt % mixture of di-block and tri-block copolymer (curve 512), with a 50:50 wt % mixture of di-block and tri-block copolymer (curve 514) and with only di-block copolymer (curve 516). To identify the yield stress of the material, stress was measured under unidirectional shear at different shear-rates. The yield stress corresponds to a plateau in the shear stress at low shear-rate and is obtained through a Hershel-Bulkley curve fit. The rheological behavior of the copolymer system can be tuned. The data in FIG. 4 shows that as the concentration of tri-block polymer is increased relative to di-block polymer, the yield stress and stiffness of the gel increases. The data in FIG. 5 shows that unrecoverable yielding of the 100% tri-block material is observed in shear-rate sweeps; when the applied shear stress exceeds the yield stress of the gel, SEBS tri-block bridges are severed. Conversely, materials with high di-block proportions behave like viscous liquids, exhibiting a crossover of elastic and viscous shear moduli in frequency-sweep measurements, and having no observed yield stress in shear-rate sweeps (FIGS. 4, 5). The moduli and the yield stress of the different formulations can also be controlled by changing the global polymer concentration by adjusting the mineral oil concentration.

Figure 6:
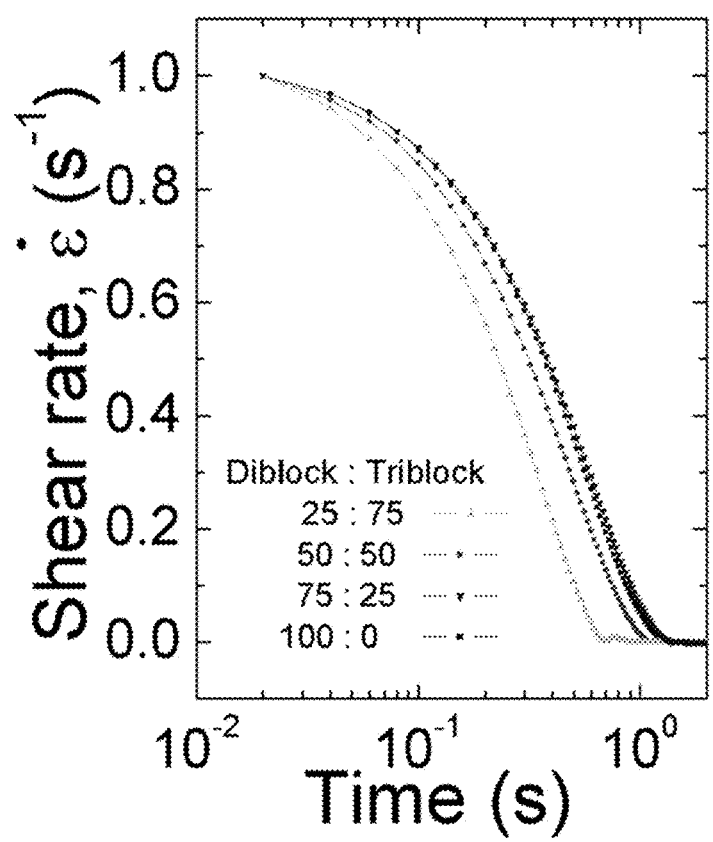
FIG. 6 is a data plot of measured shear rate c as a function of recovery time after yielding for microgels prepared according to some exemplary embodiments.

FIG. 6 is a data plot of measured shear rate c as a function of recovery time after yielding for microgels prepared according to some exemplary embodiments. In this experiment, the rate of elastic recovery in the material after the removal of applied shear stress is determined. The thixotropic time was measured by first applying a shear stress greater than the yield stress of the organic microgel system. The applied stress is then dropped below the yield stress of the material and the shear rate is measured as a function of recovery time. The recovery time represents the thixotropic time which is the duration over which shear-rate drops to zero after a high level of applied shear stress is rapidly removed. A short thixotropic time improves printing performance because it reduces the duration over which the support material is fluidized and mechanically unstable. The data plot in FIG. 6 shows shear rate as the microgels transition from sheared to non-sheared regime. For recovery time of less than 1 second, the shear rate is above zero and decreases as time elapses and the microgels are still in the fluidized region of the injector nozzle.

Desirable organogel support materials, according to some embodiments, may have thixotropic times less than 2.5, less than 1.5 seconds, less than 1 second, or less than 0.5 seconds, and greater than 0.25 seconds or greater than 0.1 seconds. Because of the yield stress behavior of the organogel support materials, materials deposited into the support material (such as through 3D printing techniques described herein) may remain fixed in place in the yield stress material, without the yield stress material needing to be cured or otherwise treated to reverse a phase change (e.g., by heating to cross-link, following printing). Rather, the yield stress materials permit an indefinite working time on deposition of materials inside yield stress materials, including printing of objects within yield stress materials. For example, in experiments described herein, printed objects stayed in place for multiple months (i.e., greater than one minute, greater than one hour, greater than one day, greater than one week, and greater than one month) without movement following deposition, without curing of the yield stress material or otherwise without treatment to reverse a phase change. This may permit continuous printing/deposition of a material within a yield stress support material for greater than one minute, greater than one hour, greater than one day, greater than one week, or greater than one month, where continuous printing would not include ceasing for reasons related to the support material (e.g., treating or curing) but may include ceasing for reasons related to printing (e.g., reloading of materials to be printed or movement of print head to a different location).

The data in FIGS. 4-6 show that the 50:50 di-block and tri-block polymer blend has an elastic modulus of about 100 Pa. This formulation has a yield stress of 3-4 Pa and a thixotropic time of about one second. Such a combination of rheological behaviors is the fingerprint of jammed soft granules.

Figure 7:
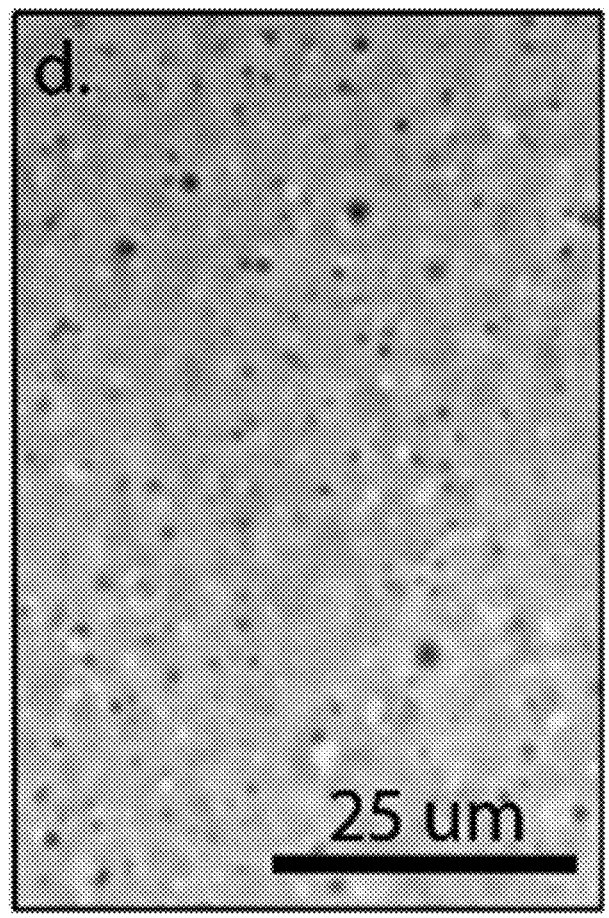
FIG. 7 is a phase contrast microscopy image of a microgel prepared according to an exemplary embodiment and diluted in mineral oil.

FIG. 7 is a phase contrast microscopy image of a microgel prepared according to an exemplary embodiment and diluted in mineral oil. In this example, the microgels were diluted by adding neat mineral oil to dilute the sample to 1% of the original copolymer concentration, thus allowing the microgel particles to suspend in the mineral oil in an un-jammed state. The microscopy image in FIG. 7 shows a plurality of granular particles 2 to 4 µm in size indicating the formation of multiple microgel particles in the mineral oil solution. Each particle may include a volume containing a polymer network, where the polymer network comprises one or more hard micelle cores formed by crosslinked polystyrene.

Figure 8:
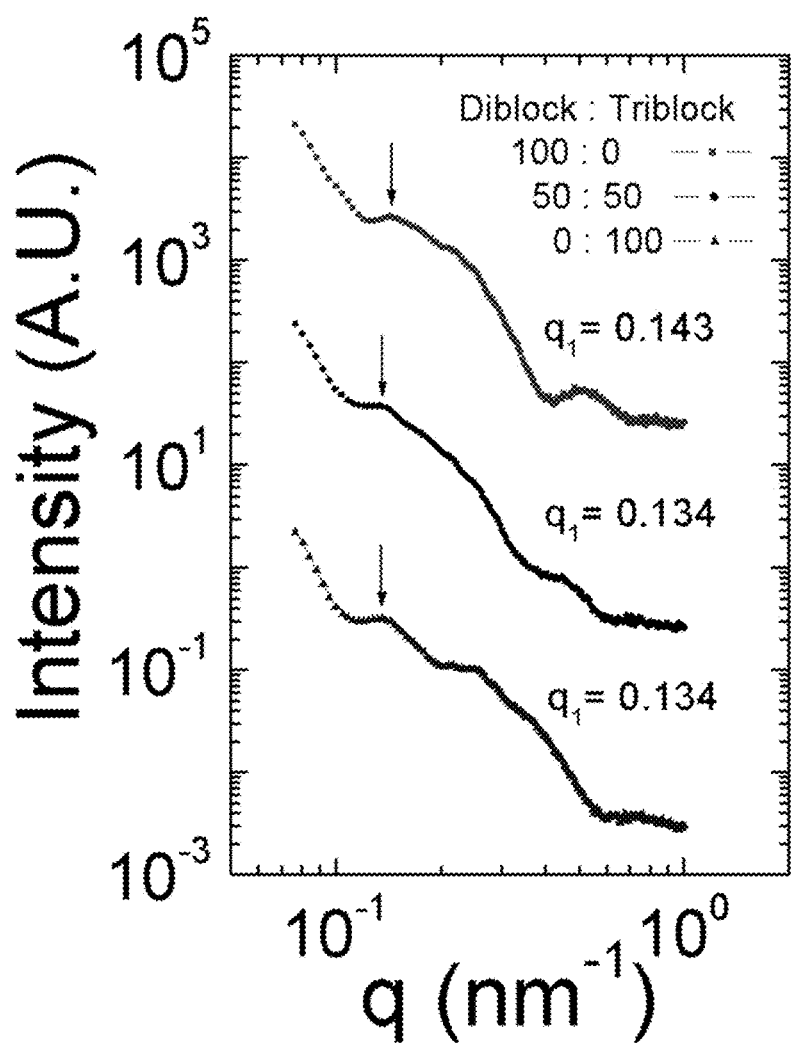
FIG. 8 is a data plot of measured small angle X-ray scattering (SAXS) intensity as a function of wave vector q for microgels prepared according to some exemplary embodiments.

FIG. 8 is a data plot of measured small angle X-ray scattering (SAXS) intensity as a function of wave vector q for microgels prepared according to some exemplary embodiments. The SAXS data in FIG. 8 provides an indication of the spacing between the micelle cores in the polymer network.

Small angle X-ray scattering measurements on organogel samples prepared at a global polymer concentration of 4.5% consisting of 100% di-block copolymer, 100% tri-block copolymer or an equal blend of the two. By determining the location of the first peak ($q_1$), one is able to calculate the average core to core spacing (d) for each sample, $d=2\pi/q_1$. With the core to core spacing, one can estimate the volume of each unit cell as $=4\pi d^3/6$. The polymer chain concentration is defined as the number of polymer chains per total volume of the system and can be calculated as $$C_{chain} = \frac{\frac{N_{av}}{MW_p}}{\frac{1}{\rho_p} + \frac{C_o}{\rho_o C_p}},$$

where $C_o$ is the concentration of the mineral oil, $\rho_o$ is the density of the mineral oil, $C_p$ is the concentration of the block copolymer, $\rho_p$ is the density of block copolymer, $MW_p$ is the molecular weight of the block copolymer. By multiplying the polymer chain concentration by the volume of each unit cell, we are able to estimate the number of copolymer chains present in a single core of the organogel system. We find the pure tri-block organogel consists of ~12 tr-iblock chains/unit cell core; the pure di-block organogel consists of ~6 di-block chains/unit cell core; and the blended organogel consists of ~6 tri-block chains and ~3-4 di-block chains/unit cell core.

Figure 9:
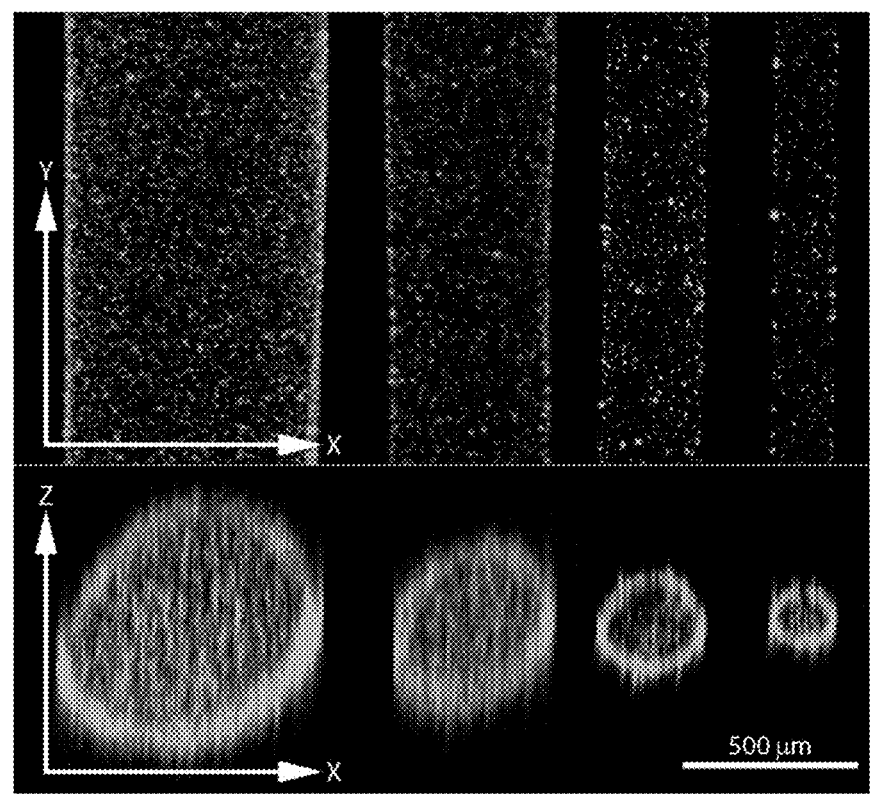
FIG. 9 is a confocal microscopy image of printed silicone features according to some embodiments.

FIG. 9 is a confocal microscopy image of printed silicone features according to some embodiments. In the example in FIG. 9, printing of silicone elastomers into the organogel support medium is accomplished using a custom made 3D printer consisting of a modified linear stage as a syringe pump attached to three linear translational stages. The three linear translational stages follow a predetermined trajectory at a specified translational speed while the syringe pump continuously deposits the silicone elastomer into the organogel medium at a set flow rate Q. To test the level of control provided by the micro-organogel for silicone 3D printing, w a series of linear features are created at many different combinations of nozzle translation speed v and injection flow rate. A test ink is made from vinyl terminated polydimethylsiloxane (PDMS) polymer, mixed with (methacryloxypropyl) methylsiloxane-dimethylsiloxane copolymer crosslinking agent at a 3:1 ratio. To enable 3D imaging with a laser scanning fluorescence confocal microscope, fluorescent beads are dispersed in the PDMS ink before printing. The images in FIG. 9 show side-on and end-on projections of printed silicone features printed using different nozzle velocity v with straight and smooth features that are nearly round in cross-section. Notably, the cross-sectional images in the x-z plane show that the printed features are approximately circular and are substantially symmetrical in width and height, which indicate that the amount of interfacial tension between the ink material and support material is low, similar to Pickering emulsion.

Figure 10:
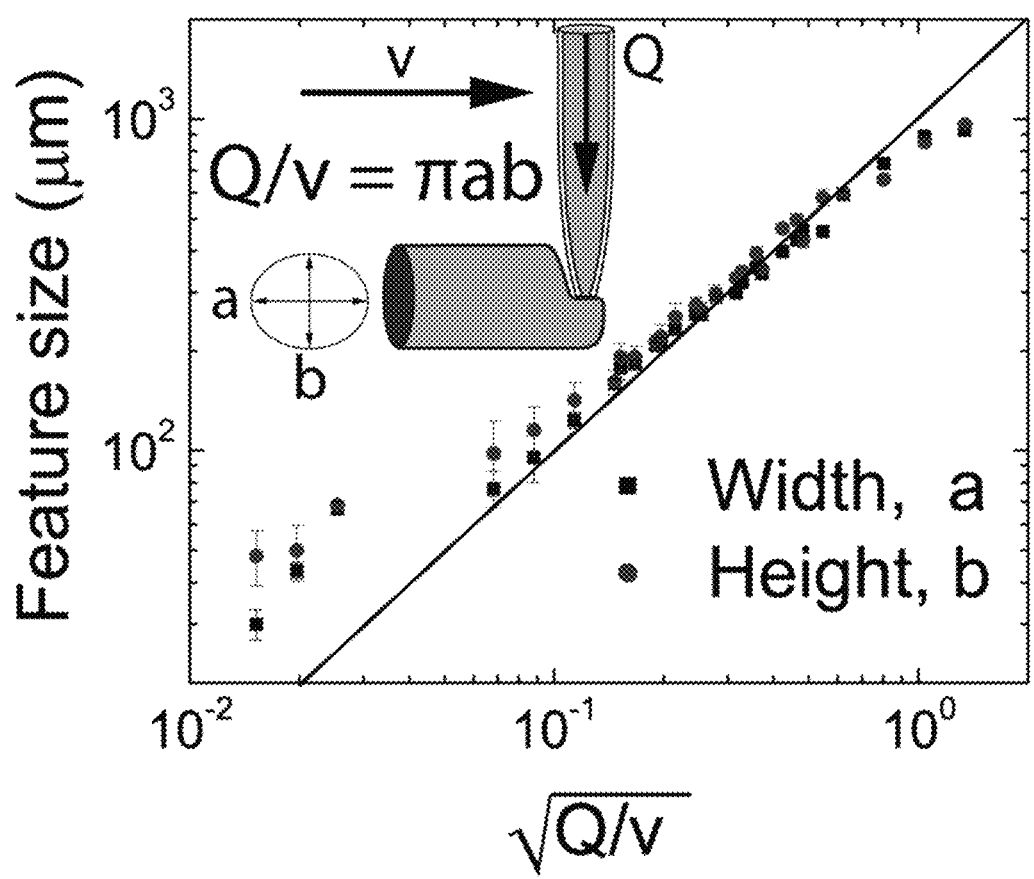
FIG. 10 is a data plot of measured printed feature area A as a function of material flow rate and tangential nozzle velocity.

FIG. 10 is a data plot of measured printed feature area A as a function of material flow rate and tangential nozzle velocity. Although a few selected samples are shown, any suitable flow rates may be selected from the range between 1 ul/hr to 3000 ul/hr. Nozzle velocities may be 1 mm/s to 10 mm/s, or 0.1 mm/s to 1 m/s. The data in FIG. 10 is a quantitative analysis of the 3D stacks as shown in FIG. 9 and illustrates a positive correlation between the printed feature size with $\sqrt{Q/v}$, where Q is the material flow rate and v is the nozzle tangential velocity along the x-direction in FIG. 9. In other words, the faster the nozzle moves, the smaller the feature size; the higher the material flow rate, the larger the feature size. The results are consistent with A=Q/v, and the principle of conservation of volume, where A is the feature's cross-sectional area. The images in FIG. 9 show that feature width and feature height are also nearly the same across all flow rates and translation speeds. Thus, features between about 1 mm and 100 µm in diameter can be created by following the simple volume conservation. In some embodiments, features as small as 30 µm were generated by reducing the ink flow rate and increasing the nozzle translation speed, indicating the high-level of precision for printing silicone structures.

Figure 11A:
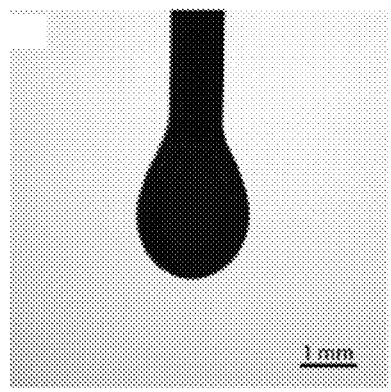
FIG. 11A is a photograph showing measurement of interfacial tension using the pendant drop method.

FIG. 11A is a photograph showing measurement of interfacial tension using the pendant drop method. FIGS. 11B-11E are data charts showing interfacial tension measurements for the interfaces measured using the pendant drop method, according to some embodiments. To estimate the strength of interaction between the organogel support material and the PDMS ink in the absence of added particulate fillers, a series of interfacial and surface tension measurements were performed. Surface tension measurements are calculated using the pendant drop method in which a drop is suspended from a needle into air. Images of the droplet are taken and analyzed in MATLAB to determine the interfacial tension between the drop and air. Interfacial tension measurements between silicone oil and mineral oil are taken using the liquid substrate method, in which a drop of light mineral oil (NF/FCC)(Fisher Scientific) is placed on a bath of 100 cSt silicone oil (Sigma Aldrich). Photo analysis and mass measurements were used to determine the spreading parameter of the droplet while interfacial tension between silicone oil and mineral oil using the spreading parameter and the individual surface tensions were determined from the pendant drop method.

Figure 11B:
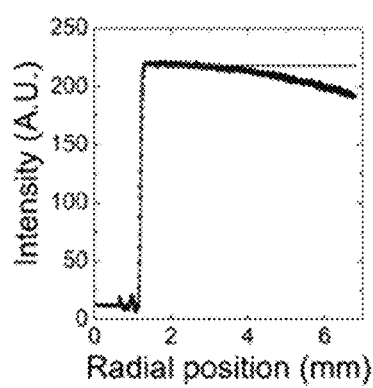
FIGS. 11B-11E are data charts showing interfacial tension measurements for the interfaces measured using the pendant drop method, according to some embodiments.
Figure 11C:
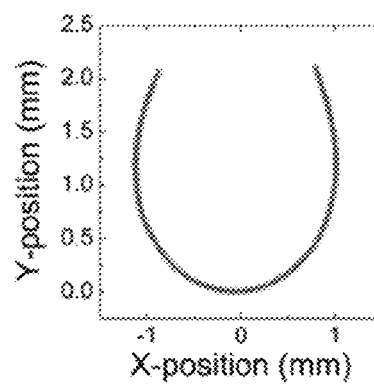
Figure 11D:
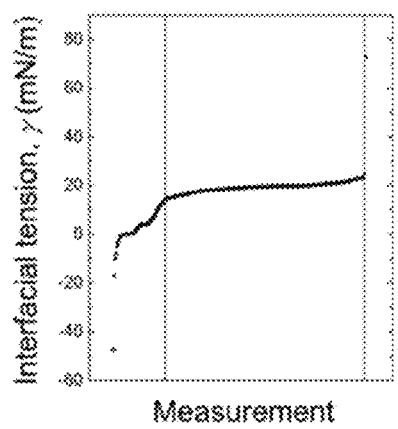
Figure 11E:
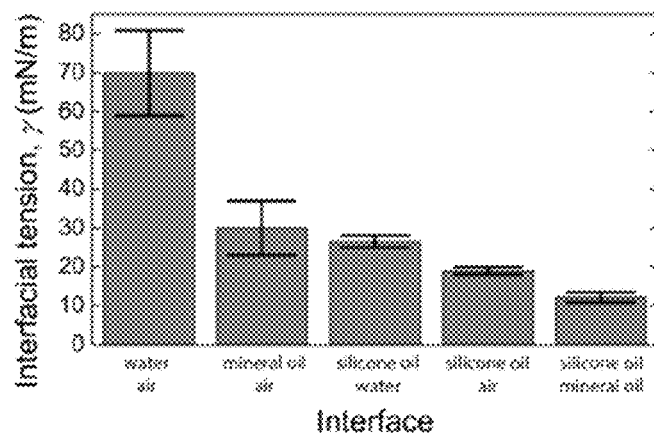

In order to define the interface between the drop and surrounding material, an image of the drop is captured in front of a diffused light source (FIG. 11A). The location of the drop edge is determined by fitting an error function to the intensity of the image as we move out radially from the center of the image (FIG. 11B). Once defined, the edge location is converted to Cartesian coordinates and we fit a curve over a range of points to smooth the shape of the drop, determine the radius of curvature, and determine the angle formed with the x-axis (FIG. 11C). We calculate the interfacial tension for each location along the droplet using the Young-Laplace equation, $1/(R/a)+\sin \phi/(x/a)=-B(x/a)+2$ where R is the radius of curvature at location (x,z), a is the radius of curvature at the origin (0,0), sin $\phi$ is the angle between the tangent to the drop at x,z and the x axis and B is defined as $B=a^2g\Delta\rho/\gamma$ where g is the gravitational constant, $\Delta\rho$ is the difference in density between the drop and the support bath, and $\gamma$ is the interfacial tension. To eliminate outlying values resulting from extreme solutions to the Young-Laplace equation (e.g. when x=0), we plot the calculated interfacial tension values from smallest to largest and remove the extreme values from consideration (FIG. 11D). The average of the remaining values is calculated to determine the interfacial tension between the drop and the support bath (FIG. 11E).

The measurement results show $\gamma_s=19.0\pm0.9$ mN/m for silicone oil in air and $\gamma_m=29.9\pm1.5$ mN/m for mineral oil in air. To determine the interfacial tension between silicone oil and mineral oil, $\gamma_{sm}$, the liquid substrate method is used in which a drop of mineral oil is placed on a silicone oil substrate. The thickness of the spread mineral oil layer, h, is determined from measurements of its diameter and volume. A balance of gravitational and interfacial forces yields $\frac{1}{2}\tilde{\rho}gh^2=\gamma_m-\gamma_s-\gamma_{sm}$, where $\tilde{\rho}=\rho_m(\rho_m-\rho_s)/\rho_s$ is the reduced density of the two-oil system, $\rho_s$ is the silicone oil density, $\rho_m$ is the mineral oil density, and $\gamma_{ms}$ is the interfacial tension between silicone oil and mineral oil. Using the parameters for $\gamma_s$ and $\gamma_m$ obtained from surface tension measurements described above, the interfacial tension is found to be $\gamma_{ms}=12.2\pm1.2$ mN/m.

In order to achieve stability in printed structures, the instabilities arising from interfacial tension must be balanced by the yield stress of the liquid like solid. To determine the minimum feature size for a given yield stress, print a range of low viscosity silicone oil are printed into the mineral oil organogel with varying yield stresses and feature stability was observed over time. We find that minimum stable feature size decreases with increasing yield stress while the time till breakup is dependent on the viscosity of the printed material. While there remains interfacial instabilities between silicone oil based ink and the mineral oil based support material, the printing of fine, precision silicone structures is possible when the curing time of the silicone is less than the time in which the interfacial instabilities arise.

Figure 12A:
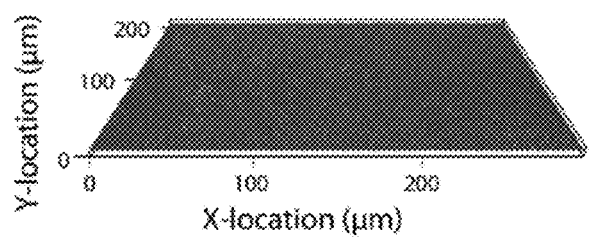
FIGS. 12A-12C are data plots showing results from scanning white light interferometry measurements.
Figure 12B:
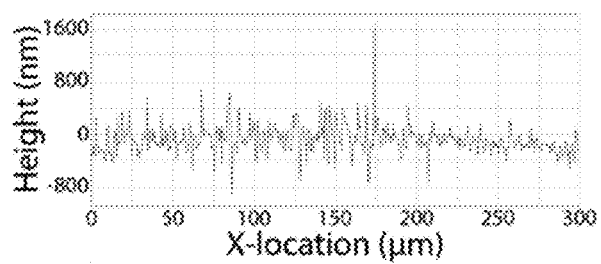
Figure 12C:
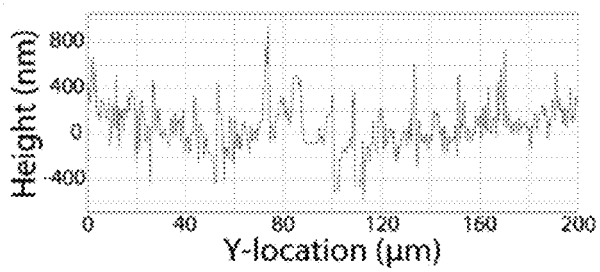
Figure 12F:
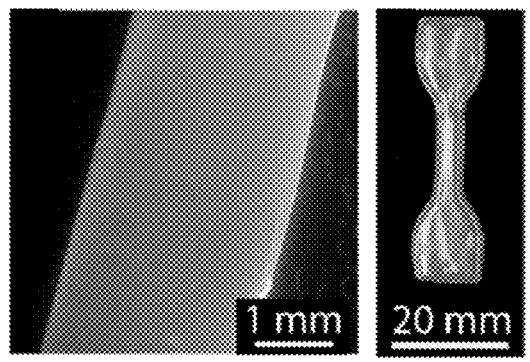
FIG. 12F is a dataplot showing extensional stress-strain tests on dog-bone samples.
Figure 12F:
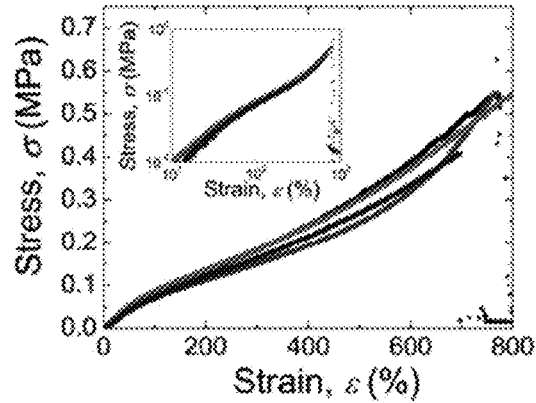

In some embodiments, the interfacial tension between silicone ink material such as PDMS and the surrounding organic support material may also assists in creating 3D printed parts with smooth surfaces. After 3D printing linear features made from Momentive UV Electro 225 PDMS and crosslinked through UV curing, the cured part is removed from the organogel support material, cleaned by serially washing in solvents and surfactant solutions and characterized. FIGS. 12A-12C show scanning white light interferometry measurement results demonstrating that the printed parts have a surface roughness of 150 nm. FIG. 12D is a scanning electron microscopy image of the cross-section of a printed silicone structure demonstrating the uniformity of printed structures, while FIG. 12e is a scanning electron microscopy image of a 3D printed "dog-bone" part designed for testing mechanical strength. The structures as pictured in FIG. 12E are printed, cured, and removed from the organic support material. FIG. 12F is a data plot showing extensional stress-strain tests on dog-bone samples demonstrating excellent mechanical integrity of 3D printed silicone parts which fail at approximately 700% strain To demonstrate the range of 3D printing capabilities enabled by the micro-organogel system, a variety of silicone elastomer structures with varying size, complexity, and materials have been printed. FIGS. 13A-13G shows photographs of 3D printed silicone structures using microgel system as support material according to some embodiments. FIG. 13A shows a model trachea implant printed out of a room temperature vulcanization silicone, Mold Max 10, in which the diameter of the tube fluctuates with height. After letting the Mold Max 10 silicone cure at room temperature for 24 hours, the model can be removed from the organogel support material and handled. In another example, FIGS. 13B-13D show isometric, top and side views, respectively, of a printed silicone scaffold with a sinusoidal wave pattern in the x-y direction as well as the x-z direction. The silicone scaffold structure has a dimension of 20×20×8 mm and is printed out of Momentive UV Electro 225 silicone with feature size on the order of 250 μm. To demonstrate the ability to print complex structures for biomedical applications such as complex macro- to meso-scale vasculatures, FIGS. 13E-13F show 3D printing of a UV curing silicone elastomer 'sea anemone' into the organogel support material. The printed structure transitions from one large base tube with a 25 mm diameter to six smaller vessels with 3 mm diameters. Once the structure is cured, removed from the micro-organogel support material and cleaned, fluids such as water may be pumped through all twelve openings at high flow rates as shown in FIG. 13G.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

What is claimed is:

1. A method of manufacturing a three-dimensional silicone structure, the method comprising:
   injecting ink material comprising silicone into a support material and displacing the support material with the ink material, and
   curing the silicone while retaining the ink material in the support material,
   wherein the ink material is injected in a pattern conforming to the three-dimensional structure,
   wherein the support material comprises a jammed microgel comprising self-assembled block copolymer particles swollen with an organic solvent such that the support material is immiscible with the ink material, and
   wherein the support material is a Herschel-Bulkley fluid having a yield stress less than 100 Pascals.

2. The method of claim 1, wherein an interfacial tension between the support material and the ink material is less than 30 mN/m.

3. The method of claim 2, wherein the interfacial tension is between 0.5 and 20 mN/m.

4. The method of claim 2, wherein the interfacial tension is between 0.1 and 5 mN/m.

5. The support material of claim 1, wherein the particles have an average diameter of between 2-6 μm.

6. The method of claim 1, wherein the block-copolymer comprises a network of particles with an average diameter between 0.1 μm and 100 μm.

7. The method of claim 1, wherein the support material is a shear thinning material.

8. The method of claim 7, wherein the support material has a yield stress of between 1 and 10 Pa.

9. The method of claim 7, wherein the support material has an interfacial tension to yield stress ratio of between 1:5 and 1:20 mN/m*Pa.

10. The method of claim 1, wherein the block copolymer comprises a di-block copolymer.

11. The method of claim 10, wherein the di-block copolymer is styrene ethylene/propylene (SEP).

12. The method of claim 1, wherein the block copolymer comprises a tri-block copolymer.

13. The method of claim 12, wherein the tri-block copolymer is styrene ethylene/butylene styrene (SEBS).

14. The method of claim 1, wherein the pattern conforming to the three-dimensional structure has a minimum feature size of 140 μm.

15. The method of claim 1, wherein the pattern conforming to the three-dimensional structure has a minimum feature size of 30 μm.

16. A support material for supporting silicone-based ink in a 3D printing operation, the support material comprising:
    a plurality of microgel particles, each of the plurality of microgel particles comprising a crosslinked polymer network, wherein the crosslinked polymer network comprises:
    a plurality of tri-block copolymer molecules;
    a plurality of di-block copolymer molecules; and
    an organic solvent, wherein the plurality of microgel particles are swollen in the organic solvent, and
    wherein the support material is a Herschel-Bulkley fluid having a yield stress less than 100 Pascals.

17. The support material of claim 16, wherein the organic solvent is mineral oil.

18. The support material of claim 16, wherein each of the tri-block copolymer molecules has a first end, an intermediate section and a second end, wherein the first end and the second end are hydrophilic, and wherein the intermediate section is disposed between the first end and the second end and is hydrophobic.

19. The support material of claim 18, wherein each of the di-block copolymer molecules has a first end and a second end, and the first end is hydrophobic and the second end is hydrophilic.

20. The support material of claim 19, wherein the di-block copolymer and tri-block copolymer contain styrene.

21. The support material of claim 17, wherein the microgel particles have an average diameter of between 2-6 μm.

22. The support material of claim 16, wherein an interfacial tension between the support material and the silicone-based ink is less than 30 mN/m.

23. The support material of claim 16, wherein an interfacial tension between the support material and the silicone-based ink is between 0.1 and 5 mN/m.

* * * * *